Figure 4:
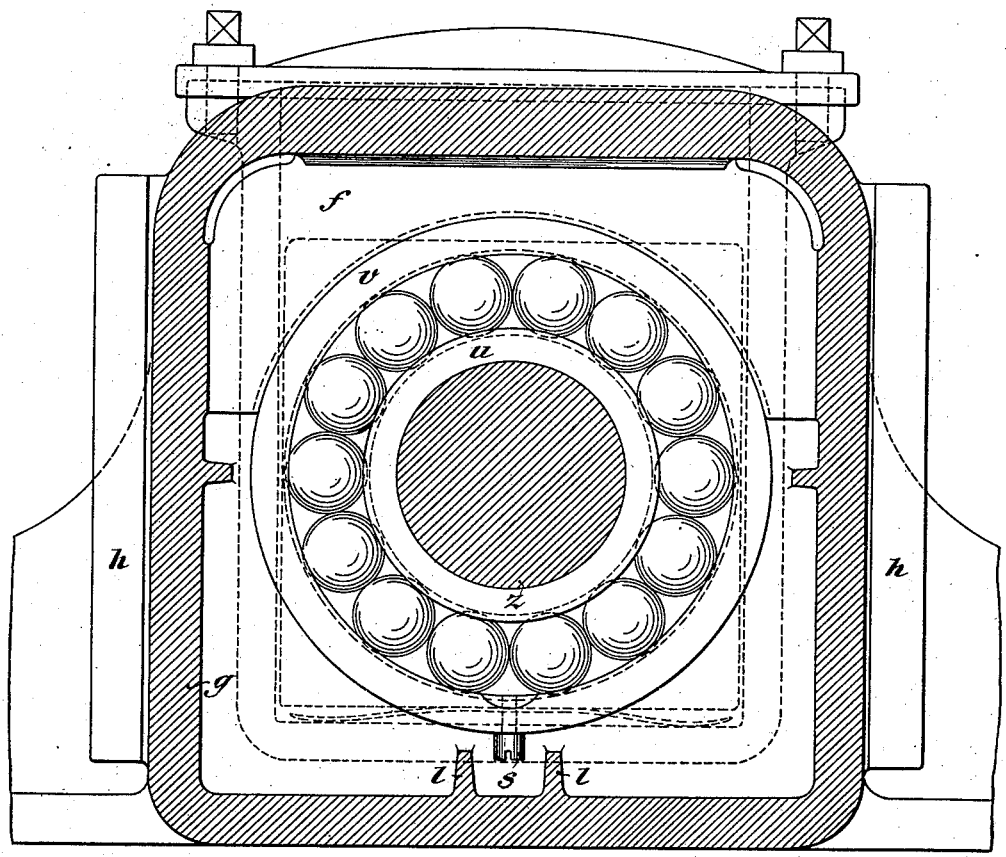

No. 687,405. Patented Nov. 26, 1901.
A. RIEBE.
AXLE BALL BEARING.
(Application filed Apr. 17, 1900.)
(No Model.) 3 Sheets—Sheet 1.
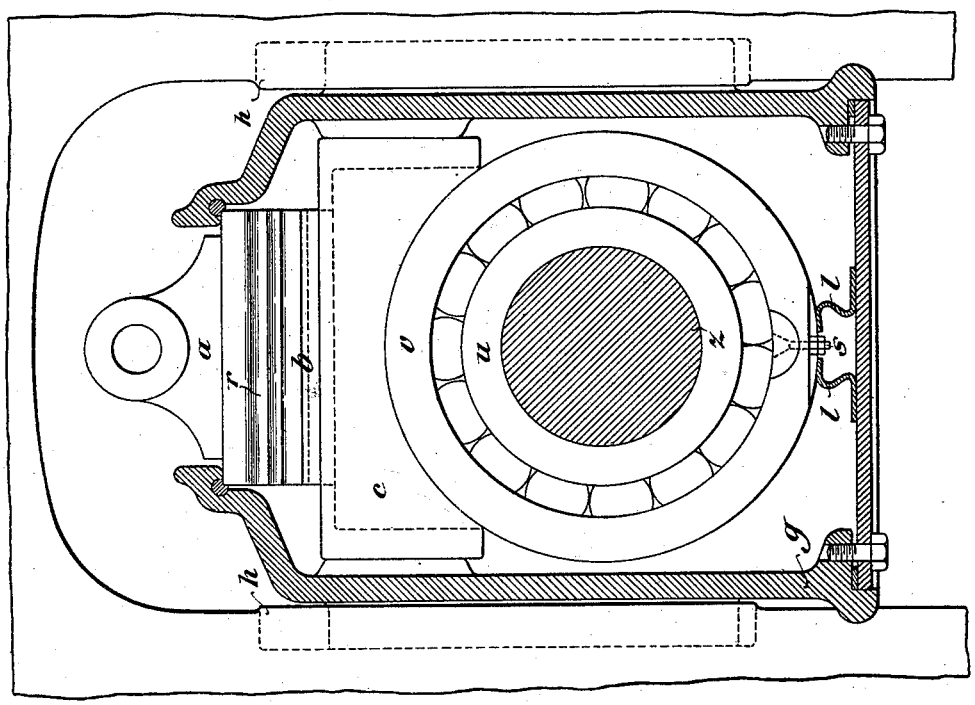
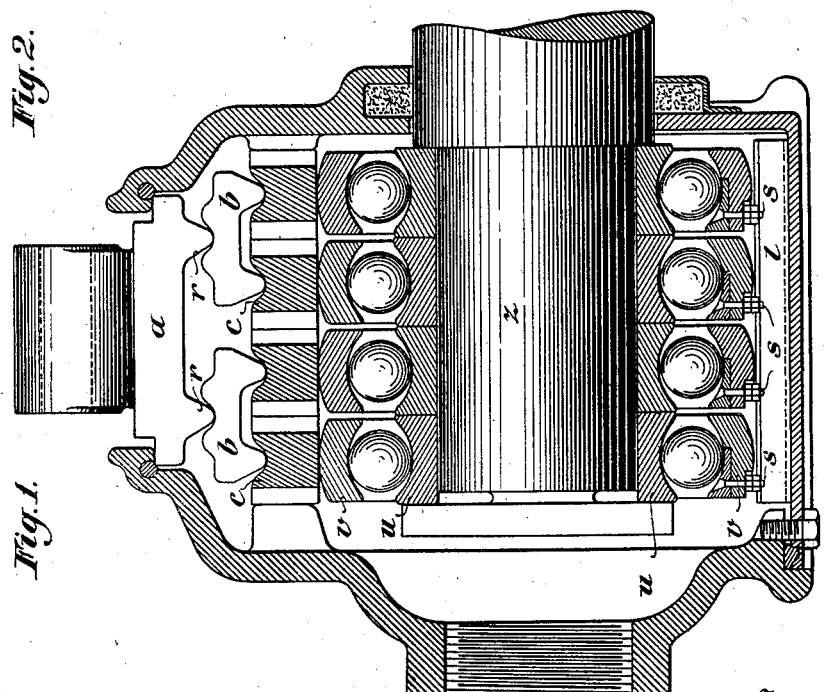
Witnesses
Inventor
August Riebe
By his Attorneys
Redding, Kiddle & Greeley

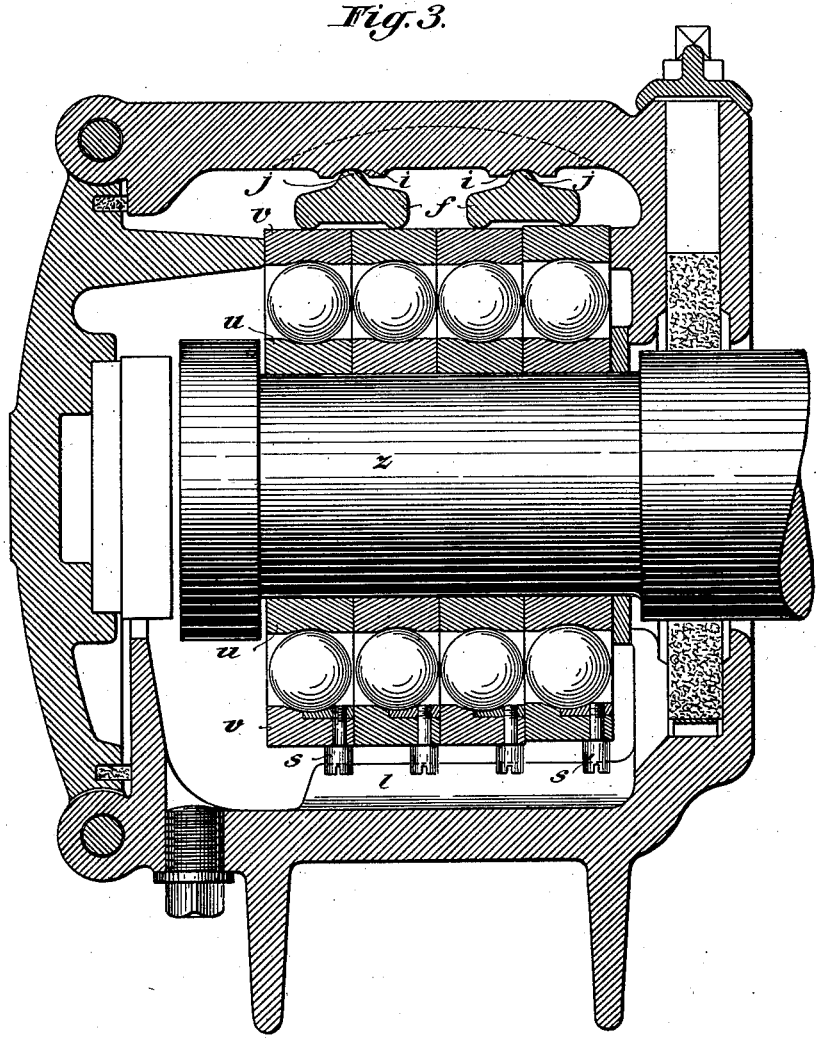

No. 687,405. Patented Nov. 26, 1901.
A. RIEBE.
AXLE BALL BEARING.
(Application filed Apr. 17, 1900.)

(No Model.) 3 Sheets—Sheet 3.

UNITED STATES PATENT OFFICE.

AUGUST RIEBE, OF BERLIN, GERMANY, ASSIGNOR TO THE FIRM OF DEUTSCHE WAFFEN- & MUNITIONSFABRIKEN, OF BERLIN, GERMANY.

AXLE BALL-BEARING.

SPECIFICATION forming part of Letters Patent No. 687,405, dated November 26, 1901.

Application filed April 17, 1900. Serial No. 13,243. (No model.)

*To all whom it may concern:*

Be it known that I, AUGUST RIEBE, mechanical engineer, a subject of the King of Prussia, German Emperor, residing at $15^d$ Zwinglistrasse, Berlin, Kingdom of Prussia, German Empire, have invented certain new and useful Improvements in Axle Ball-Bearings; and I do hereby declare the following to be a full, clear, and exact description of the invention, such as will enable others skilled in the art to which it appertains to make and use the same.

This invention relates to heavily-loaded bearings having several rows of balls in which it is difficult to meet the requirement that all the rows of balls be equally subjected to the strain of bearing the load.

The invention consists in an improved arrangement which fulfils its object for bearings in which the direction of pressure is essentially a definite one and is especially suitable for axle-bearings of tram-cars.

The essential feature of the improvement consists in an arrangement of movable balance cross-bars receiving the load, against each of which two rings of balls bear directly or indirectly, so that they are mutually movable and can mutually influence one another in the direction of equalizing the pressure as regards small differences in the size of the balls or the races.

In the accompanying drawings, Figure 1 is a longitudinal section, and Fig. 2 a cross-section, of an axle-bearing serving as an example of construction, in which axle-bearing the cross-pieces act directly by means of plates which straddle the ball-races. Fig. 3 is a longitudinal section, and Fig. 4 a cross-section, of a form of construction in which the cross-pieces themselves are formed as plates and directly support the ball-races.

In the examples shown the means for resisting the longitudinal or axial thrust on the ends of the bearings are not shown, as only the normal strain is intended to come into question in view of the distribution of the weight over several rows of balls.

The axle-box $g$ slides, as usual, between guides $h$ of the underframe of the carriage or car. A spring-plate of the spring suspension is indicated by $a$ in Figs. 1 and 2, on which plate the weight of the car is received. The axle-journal $z$ is provided with suitable bearing-rings $u$, on which run the rows of balls, of which there are here four employed. The outer bearing-rings or races $v$ belonging thereto are secured against rotation by means of strips or bars $l$ and the heads of screws $s$, which screws serve incidentally for securing in position the closing-plugs of the ball-insertion recesses on the rings.

The under side of the spring-plate $a$, on which the axle-box is suspended, is provided with two or as many ridges $r$ as there are pairs of rows of balls. The said ridges form lever-fulcrums for prismatic cross-pieces $b$, which are thus movable on a knife-edge, like a balance-beam. Each cross-piece $b$ supports a pair of the rows of balls, such support being effected, according to Figs. 1 and 2, by means of ball-race plates $c$, arranged side by side in the casing and so as to be vertically movable. These plates $c$ are placed singly upon the rings $v$, and by reason of the pressure of the tilting cross-piece $b$ on two of the plates $c$ the load is evenly distributed over the rows of balls. If it be assumed that the size of balls is somewhat different in the adjacent rows of balls or that the races or bearing-surfaces have worn away somewhat unequally, the even distribution of the load on the ball-race rings is secured by the suitable tilting adjustment of the cross-pieces $b$, the said ball-race rings being capable of a mutual adjustment or movement. This condition is not altered even when the axle is placed obliquely to a vertical plane.

The form of construction shown in Figs. 3 and 4 differs essentially from the one described merely by the cross-pieces, which in this case are indicated by $f$, having their points of support directly on the rings $v$ of the rows of balls. The cross-pieces $f$ have the form of plates and are provided with a semicircular recess in order to pass over the rings $v$, of which each two adjacent ones exert a supporting action on the corresponding bottom projections of one cross-piece, as shown in Fig. 3. An upper rib $j$ on each cross-piece, in combination with a groove $i$, provided in the upper wall of the axle-box, forms the tilting point or support on which the cross-piece can execute the necessary pivoting movement or oscillation in order to effect an even distribution of the load.

If it be desired to obtain a swiveling or mobility of the ball-bearing to incline the axle to a vertical plane, the part supporting the crosspieces $f$ from above may be formed as a separate insertion, as in the case of the first-described form, which is located in the axle-box, with a spherical or cylindrical outer surface, as shown in dotted lines in the cross-section of the wall in a dome form and indicated in Fig. 3 in the insertion-outline.

What I claim is—

In a bearing, the combination with a plurality of rows of balls and ball-race rings of a balance beam or bar to support or transmit pressure to each pair of rows of balls or of ball-race rings and means to support or transmit pressure to such balance beam or bar, whereby the pressures on the two rows of balls are equalized.

In witness whereof I have hereunto set my hand in presence of two witnesses.

AUGUST RIEBE.

Witnesses:
HENRY HASPER,
WOLDEMAR HAUPT.